(12) United States Patent
Goodman et al.

(10) Patent No.: US 6,487,474 B1
(45) Date of Patent: Nov. 26, 2002

(54) AUTOMATED DATA STORAGE LIBRARY WITH MULTIPURPOSE SLOTS PROVIDING USER-SELECTED CONTROL PATH TO SHARED ROBOTIC DEVICE

(75) Inventors: Brian G. Goodman; Leonard G. Jesionowski, both of Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/853,721

(22) Filed: May 10, 2001

(51) Int. Cl.[7] .............................................. G06F 19/00
(52) U.S. Cl. ...................... 700/245; 700/246; 700/247; 700/248; 700/249; 700/258; 700/260; 700/261; 711/111; 711/112; 711/113; 711/114; 701/23; 701/30; 369/30.31; 369/30.46; 713/1
(58) Field of Search ................................. 700/245, 246, 700/258, 251, 260, 261, 218, 247, 249; 713/1; 711/114, 111–113, 159; 369/30.46, 30.31; 360/92; 414/277, 281, 253.1, 807, 273; 710/1, 13; 701/23, 30

(56) References Cited

U.S. PATENT DOCUMENTS

| | | | | |
|---|---|---|---|---|
| 5,287,459 A | * | 2/1994 | Gniewek ..................... 711/111 |
| 5,303,214 A | | 4/1994 | Kulakowski et al. .......... 369/34 |
| 5,412,791 A | * | 5/1995 | Martin et al. ................ 711/114 |
| 5,421,697 A | * | 6/1995 | Ostwald .................... 414/753.1 |
| 5,471,561 A | * | 11/1995 | Cowgill et al. .............. 700/247 |
| 5,502,811 A | * | 3/1996 | Ripberger ....................... 714/6 |
| 5,504,873 A | * | 4/1996 | Martin et al. ................ 711/111 |
| 5,513,156 A | | 4/1996 | Hanoka et al. ................ 369/34 |
| 5,522,090 A | | 5/1996 | Tanaka et al. ................ 395/894 |
| 5,546,315 A | * | 8/1996 | Kleinschnitz ................ 700/218 |
| 5,546,366 A | | 8/1996 | Dang ........................... 369/36 |
| 5,570,337 A | | 10/1996 | Dang .......................... 369/192 |
| 5,594,922 A | | 1/1997 | Suzuki et al. ................ 395/837 |
| 5,613,154 A | * | 3/1997 | Burke et al. ..................... 710/1 |
| 5,664,146 A | * | 9/1997 | Bolin et al. ................. 711/115 |
| 5,703,843 A | | 12/1997 | Katsuyama et al. ........... 369/34 |
| 5,761,161 A | | 6/1998 | Gallo et al. .................... 369/36 |
| 5,794,238 A | * | 8/1998 | Gural ............................. 707/6 |
| 5,878,270 A | | 3/1999 | Kobayashi .................. 395/821 |
| 5,894,461 A | * | 4/1999 | Fosler et al. ............. 369/30.31 |
| 5,914,919 A | * | 6/1999 | Foslet et al. ............. 369/30.31 |
| 5,970,030 A | * | 10/1999 | Dimitri et al. ........... 369/30.46 |
| 6,029,230 A | * | 2/2000 | Ng .............................. 711/159 |
| 6,052,341 A | * | 3/2000 | Bingham et al. ............ 414/112 |
| 6,073,218 A | | 6/2000 | DeKoning et al. .......... 711/150 |
| 6,098,114 A | | 8/2000 | McDonald et al. ............. 710/5 |
| 6,105,103 A | | 8/2000 | Courtright, II et al. ......... 711/1 |
| 6,262,863 B1 | * | 7/2001 | Oswald et al. ................ 360/92 |
| 6,295,578 B1 | * | 9/2001 | Dimitrioff et al. .......... 711/114 |
| 6,298,439 B1 | * | 10/2001 | Beglin ........................... 713/1 |
| 6,304,798 B1 | * | 10/2001 | Carpenter ................... 700/258 |

FOREIGN PATENT DOCUMENTS

DE                3801397        *   8/1989

OTHER PUBLICATIONS

IBM Technical Disclosure Bulletin, vol. 34, No. 6, Nov. 1991, "Data Sharing for Cooperative Processing in Heterogeneous Environment", pp. 20–21.

(List continued on next page.)

*Primary Examiner*—William A. Cuchlinski, Jr.
*Assistant Examiner*—McDieunel Marc
(74) *Attorney, Agent, or Firm*—Dan Hubert & Assoc.

(57) ABSTRACT

A data storage library features multipurpose slots each configured to receive a media drive (operable to read/write data from/to media removably loaded into the media drive) a command relay port (operable to convey media transport signals from a host to a shared robotic media transport device), or various other modules. The robotic device is programmed to recognize whether each slot is empty or whether it is filled with a component such as a media drive or a command relay port, and to thereafter communicate with the occupant appropriately.

28 Claims, 4 Drawing Sheets

OTHER PUBLICATIONS

IBM Technical Disclosure Bulletin, vol. 36, No. 10, Oct. 1993, "Improved Disconnect/Reconnect Criteria in Data Storage Devices", pp. 175–177.

Owen et al., A modular re–configurable approach to the creation of flexible manufacturing cells for educational purposes, 1997, IEEE, 1369–1374.*

* cited by examiner

AUTOMATED DATA STORAGE LIBRARY WITH MULTIPURPOSE SLOTS PROVIDING USER-SELECTED CONTROL PATH TO SHARED ROBOTIC DEVICE

BACKGROUND OF THE INVENTION

1. Field of the Invention

The present invention relates to automated data storage libraries that manage the loading, unloading, and transfer of portable data storage media to/from media drives as well as data exchange between library hosts and media loaded in such drives. More particularly, the invention concerns a data storage library having a robotic media transport device and featuring multipurpose slots configured to receive (1) a media drive, operable to read and/or write data from/to media removably loaded into the media drive, (2) a command relay port, operable to convey command signals from a host to the robotic device, or (3) a module of various other types. The robotic device is programmed to recognize which type of module occupies each slot, or whether a slot is empty, and communicate with the occupant appropriately.

2. Description of the Related Art

One of the most popular mass storage systems today is the data storage "library". Generally, a data storage library connotes a great number of commonly housed portable ("removable") data storage media, which are moved among various storage bins, import/export regions, and media drives by a robotic media transport device. These libraries have become popular for many reasons. First, the portable data storage media, usually magnetic tape or optical media, are typically quite inexpensive relative to other storage formats such as magnetic disk drives. Furthermore, libraries are easily expanded to accommodate more data, by simply adding more media items. Additionally, most libraries can be easily updated with new equipment. For example, a new media drive can be introduced to the library to supplement or replace the existing media drives.

A number of different companies manufacture such libraries today, each model demonstrating various different features and operating principles. One significant manufacturer of data storage libraries is International Business Machines Corp. (IBM). Although a number of different IBM libraries have widespread use and commercial success, IBM engineers are continually seeking to improve various aspects of their libraries.

One area of focus is cost reduction, and more particularly, cutting hardware costs by designing libraries that are easily reconfigurable and share components where possible. It is often difficult, however, to design components that perform multiple functions or that respond to plural master units. Frequently, this level of flexibility requires the addition of a cumbersome layer of coordinating or supervising software code, which can ultimately reduce the performance of other unrelated aspects of the library. For instance, developing software to enable multiple incompatible hosts to manage a shared inventory of media items can be prohibitively difficult or expensive in many situations.

In other cases, a shared component may need to include separate ports for different hosts, thus increasing the hardware cost of the shared component. Furthermore, some configurations experience incompatibility when multiple components share a bus or other feature, resulting in reduced or lost data availability. Thus, engineers are confronted with a number of difficult challenges in their quest to consolidate components or otherwise reduce hardware expenses in a data storage library. One approach that addresses the foregoing concerns is set forth in U.S. patent application Ser. No. 08/931,856, filed on Sep. 16, 1997 in the names of Basham et al. and entitled "AUTOMATED DATA STORAGE LIBRARY WITH CONTROL PATH TO SHARED ROBOTIC DEVICE VIA MEDIA DRIVE,". The entirety of the foregoing patent is hereby incorporated herein by reference.

Basham et al. disclose a data storage library featuring a dual purpose data/control path between a host computer and a media drive. This path conveys control signals and data between the host and drive, and also conveys robotic control signals from the host to a robotic media transport device coupled to the drive. Although this approach provides various benefits, IBM engineers are seeking new ways to reduce library costs and improve the customer's options for reconfiguring the library. In this regard, one area of possible consideration is developing a system that is sufficiently reconfigurable, yet avoids the need for the customer to incur the expense of purchasing special, dual purpose media drives capable of conveying robotic control signals in addition to the normal drive functions. From a marketing standpoint, a related problem is that customers that have already elected to build a library utilizing a conventional media drive model might dismiss the Basham et al. library because it requires at least one unique media drive type, namely a proprietary dual purpose media drive capable of conveying host commands to the library's robotic media transport device in addition to the normal drive functions. Thus, further improvements are still sought to reduce costs and improve the flexibility of configuring data storage libraries.

SUMMARY OF THE INVENTION

Broadly, the present invention concerns a data storage library having a robotic media transport device and also featuring multipurpose slots each configured to receive an occupant such as a media drive (to read and/or write data from/to media removably loaded into the media drive) or a command relay port (to convey command signals from a host to the robotic media transport device). The invention additionally contemplates the insertion and use of other modules in the slots, such as dual function media drive/relay ports, switches, hubs, gateways, routers, network storage, Ethernet units, DASD, hosts, storage emulators, etc. The robotic media transport device is programmed to recognize which type of module (if any) occupies each slot, and to communicate with any occupant appropriately.

Cables, connectors, or other couplings are provided to automatically or manually electrically couple any media drive or command relay port (or other module) occupying the slot with the robotic media transport device, and optionally with a host if applicable. For each slot, the robotic device determines a state of each slot including the type of module occupying each slot, or whether the slot is empty. For each slot occupied by a command relay port, the robotic device receives media transport commands from a host through the command relay port, and carries out these commands to move the media items among specified media locations including media storage bins, media drives, etc. For each slot occupied by a media drive, the robotic device may exchange various configuration information, system management messages, or nothing at all.

As described above, then, one aspect of the invention concerns an apparatus such as a data storage library. The invention may also be implemented in a number of other forms. For example, the invention may be implemented to provide a method operable in a data storage library. In still another embodiment, the invention may be implemented to provide a signal-bearing medium tangibly embodying a program of machine-readable instructions executable by a digital data processing apparatus to operate in a data storage library as discussed herein. Another embodiment concerns logic circuitry having multiple interconnected electrically conductive elements configured to operate in a data storage library as discussed herein.

The invention affords its users with a number of distinct advantages. Significantly, this invention preserves the customer's data storage library investment, since command relay ports can be upgraded to externally communicate using new and different host interconnects and/or protocols while preserving the same type of internal communications with the robotic device. Thus, by upgrading command relay ports as necessary, the customer can isolate the robotic device from changes in technical standards or technology itself. Changes to the library's host interfaces therefore need not render the robotic device obsolete. The invention also offers an advantage in that the data storage library accommodates a variety of different slot occupants, and can be reconfigured as to the number and type of such occupants, number and type of host connections to the robotic device, and the like. In this regard, the invention is scalable, since the customer may increase (or decrease) the number of command relay ports at any time to accommodate a host being added (or removed); moreover, this benefit is possible without having to dedicate space in the library for any ports. Relatedly, the invention is flexible because any given slot may be housed with a command relay port or media drive (or other module), giving the advantage of increasing host connections, data access devices, or logical libraries within one library system.

Also, since the robotic media transport device communicates with separate hosts via separate command relay ports, and may be configured to partition the body of media items for non-overlapping host access, the invention avoids complicated host software that would otherwise be required to operate shared components. And, in the event multiple command relay ports are installed, the invention also offers the advantage of providing redundant paths to the robotic device, which may be useful when a desired path to the robotic device fails or is otherwise unavailable. Also, since the slots may house distinct and even incompatible command relay ports, the library of the invention is beneficial because it enables sharing of a single robotic media transport device and a common inventory of media items despite having a heterogeneous mix of otherwise incompatible hosts, application software and/or communication protocols.

As another advantage, having multiple, separate command relay ports corresponding to separate hosts simplifies partitioning of the media items in the library. Namely, the robotic media transport device may associate each command relay port with a different partition of media items, restricting all media transport commands arriving over a given command relay port to the corresponding partition. This simplifies host processing, since each host enjoys exclusive access to its own perceived "library," although this "library" is actually a smaller partition of the entire body of media items. Further, partitioning helps preserve the security and integrity of the library by preventing different hosts from confusing each other by inconsistently using shared media items. As compared to the use of a completely separate library for each host, which would also preserve library security and integrity, partitioning reaps a certain economy of scale by sharing the library housing, shelves, robotic mechanism, and other common library infrastructure.

The invention also provides a number of other advantages and benefits, which should be apparent from the following description of the invention.

DETAILED DESCRIPTION

The nature, objectives, and advantages of the invention will become more apparent to those skilled in the art after considering the following detailed description in connection with the accompanying drawings.

HARDWARE COMPONENTS & INTERCONNECTIONS

Introduction

Figure 1A:
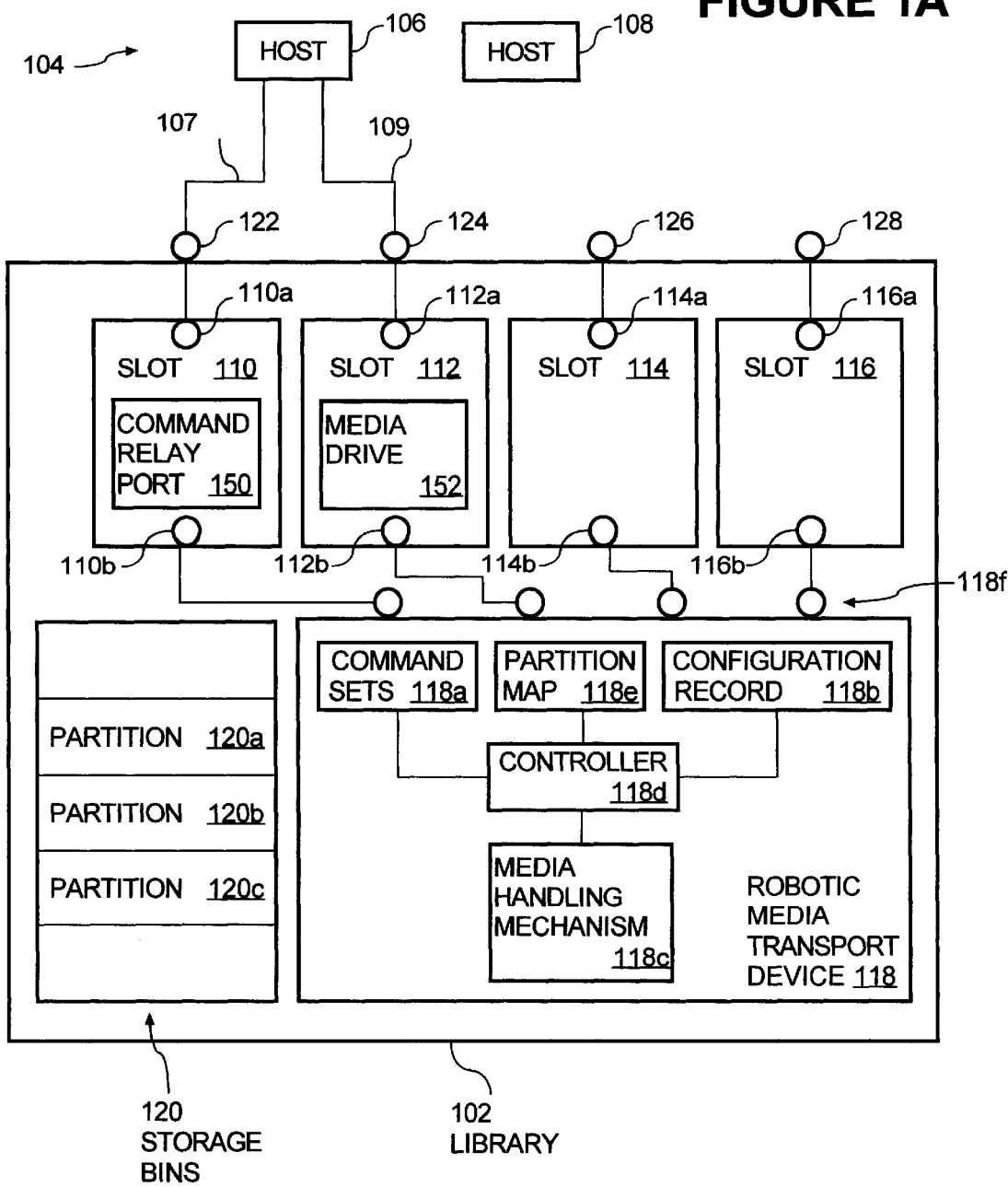
FIG. 1A is a block diagram of the hardware components and interconnections of a data storage library according to the invention.

One aspect of the invention concerns a data storage/retrieval library, which is exemplified by the library 102 of FIG. 1A. The library 102 is coupled to one or more hosts 104, which comprise two hosts 106, 108 in the illustrated example. The library 102 includes a number of slots 110, 112, 114, 116, a robotic media transport device 118 ("robotic device"), and various storage bins 120 for media items. Each slot 110–116 is configured to receive, at minimum, either (1) a media drive, such as 152, operable to read and/or write data from/to media removably loaded into the media drive, (2) a command relay port, such as 150, operable to convey media transport commands from a host to the robotic device, or (3) a module of various other types (not shown). The robotic device 118 is programmed to recognize which type of module occupies each slot 110–116 (or whether any slots are empty), and to communicate with the occupants appropriately.

Storage Bins

The library 102 manages the positioning and access of "removable" or "portable" data storage media such as magnetic tape, optical tape, optical disk, removable magnetic disk drive storage, CD-ROM, digital video disk (DVD), compact flash or smart media, plug-in circuit modules, or other appropriate format. Some of these types of storage media may be self-contained within a portable container, or "cartridge". For universal reference to any of these types of storage media, this disclosure refers to "items" of media.

The storage bins 120 house the media items. The bins 120 may comprise shelves, slots, racks, frames, or any device(s) for holding media items of the type implemented in the library 102. The bins 120 may also include one or more shelves, portals, doors, compartments, or other import/export construct to aid the robotic device 118 in exporting media items from the library 102 or receiving media items externally introduced into the library 102.

The storage bins 120 media items, or a combination of both may be logically divided into various partitions 120a–120c, as discussed in greater detail below.

Hosts

The hosts 106, 108 comprise mainframe computers, computer workstations, personal computers, computer networks, servers, data entry terminals, network devices, network appliances, or other means capable of providing media transport commands to appropriately configured occupants of the slots 110–116 (such as, command relay ports, for example), housed in the slots 110–116, and capable of exchanging machine-readable data with media drives housed in others of the slots 110–116. As a specific example, the hosts 106, 108 may comprise computing machines such as IBM brand RS/6000 servers.

Slots & Connectors

The slots 110–116 comprise openings, receptacles, housings, shelves, drawers, frames, or other constructs to receive media drives and command relay ports. As a specific example, the slots 110–116 may comprise rigid bays sized to receive 5.25 inch form factor tape drives such IBM model 3570 tape drives.

In one embodiment, each slot includes a host connector, shown as 110a, 112a, 114a, 116a. Each slot's host connector is configured to automatically, detachably, and electrically couple to a media drive or command relay port upon insertion into that slot. The host connectors 110a–116a are electrically coupled to external library connectors 122–128, which are utilized for manually coupling to hosts 106, 108 via host cables 107, 109. More particularly, in configuring the library 102 for operation, each occupied slot (such as 110, 112 as illustrated) is coupled to one of the hosts by attaching a host cable (such as 107, 109) to the slot's corresponding external library connector (such as 122, 124).

Alternatively, the slot connectors 110a–116a may be coupled to their occupants by hand, rather than automatically. In still another embodiment, connectors 110a–116a for one or more slots may be omitted, in which case the occupants of these slots are manually coupled to their respective hosts, for example by coupling a cable between a fixture of the slot occupant and the external connector 122–128 or the host itself.

The host cables 107, 109 may comprise any suitable means for conveying signals, such as a bus with one or more conductive members (such as wires, coaxial cable, twisted pair, conductive traces, etc.), wireless communications (such as radio frequency or other electromagnetic signals, infrared communications, etc.), fiber optic communications, or another suitable path. Furthermore, the cables 107, 109 may employ serial, parallel, or another communications format, using digital or analog signals as desired.

In the case of the cable 109, the purpose is to conduct data back and forth between the host 106 and media drive 152, such data being written to and/or read from a media item mounted to the drive 152. Relatedly, the cable 109 may also carry commands directed from the host 106, to the media drive 152, such as READ, WRITE, REWIND, ADVANCE, UNLOAD, etc. The purpose of the cable 107 is to conduct high-level instructions ("media transport commands") between the host 106 and the robotic device 118 via the command relay port 150. The media transport commands constitute instructions for the robotic device to retrieve, move, and place various media items as desired by the hosts. If desired, the cable 107 may also carry response signals returned by the robotic device 118 to the host 106.

Optionally, the drive 152 may comprise a dual purpose media drive as taught by the '856 application mentioned above. In this embodiment, the back end of the drive 152 (i.e., port 112b) is coupled to the robotic device 118 via the port 118f, and the cable 109 additionally functions to carry media transport commands between the host 106 and robotic device 118 via the dual purpose drive 152.

A single host may be coupled to multiple slots in order to achieve multiple connections, for example to multiple media drives and/or command relay ports residing in the slots. In the embodiment mentioned above, where each slot includes a host connector 110a–116a, the shape, placement, electrical pin-out, and other configuration of the connectors 110a–116a may be selected to receive and electrically mate with corresponding connectors (not shown) on media drives and command relay ports, or cables thereto. Ordinarily skilled artisans, having the benefit of this disclosure, will recognize a variety of different connectors and/or cables suitable for these purposes.

In addition to the host connectors 110a–116a, each slot 110–116 may include a robotic device connector 110b–116b, according to one embodiment. The robotic device connectors 110b–116b are configured to detachably, electrically couple to command relay ports inserted into the respective slots, and may even achieve such coupling automatically upon insertion of the command relay port. The connection 110–116b may also couple to other components inserted into the respected slots and requiring communications with the robotic device, such components including as one example dual purpose media drives. In one embodiment of the invention, which contemplates the exchange of configuration-related information (non-customer-data) between the robotic device 118 and media drives such as 152, the robotic device connectors 110b–116b may also be configured to detachably, electrically couple to media drives in the slots. Each connector 110b–116b may be implemented by a single, common connector compatible with both command relay ports and media drives, or separate connectors to accommodate any differences in the respective layouts of command relay ports and media drives. Moreover, rather than the direct connections as illustrated in FIG. 1A, connections between the slots 110–116 and the robotic device 118 may be implemented in other forms, such as one or more loops, rings, networks, switches, daisy chains, multidrop configuration, etc. As still another alternative, the connectors 110b–116b may be omitted, with connection between slot occupants and the robotic device 118 being made manually by cable, wire, wireless coupling, or other link. Ordinarily skilled artisans, having the benefit of this disclosure, will recognize a variety of different connectors that may be suitable for the foregoing purposes.

Media Drives

The media drives comprise machines for exchanging data with portable data storage media such as those mentioned herein. Each drive may be read-only, write-only, or read/write drives, depending upon the needs of the application. In the illustrated examples, the media drives comprise 5.25 inch size magnetic tape drives. One exemplary tape drive is the IBM model 3570 tape drive. Although magnetic tape is discussed herein, the media drives may comprise machines for reading and/or writing other removable media such as optical diskettes, removable magnetic disk storage, plug-in memory modules, etc.

As one example of the installation and use of a media drive, the media drive 152 is shown installed in the slot 112. The media drive 152 receives hosts' read and/or write requests upon the connector 112a, and responds by accessing the loaded media item and transmitting or receiving the requested data via the host connector 112a. Optionally, if the media drive and robotic device are so configured, the media drive may exchange configuration information (non-customer-data) with the robotic device 118 via the robotic device connector 112b. Such configuration information includes, as examples, status signals, error messages, configuration data, and other information concerning properties of the drive and/or its operation.

Recognizing the lack of standardization in media drive pin-outs, connectors, physical depths, and other features, the compatible media drives may comprise commercially available media drives repackaged to uniformly fit and connect to the slots. As standards evolve, however, the slots may be designed for compatibility with pin-outs, connectors, sizes, and other media drive features that become standardized.

Command Relay Ports

In the illustrated examples, each command relay port (such as 150) comprises a 5.25 inch form factor, electronic interface configured to relay signals between one of the hosts (such as 106) and the robotic device 118. More particularly, the command relay port 150 translates between signals in the interface format used by hosts (such as SCSI signals present at the host connectors 110a–116a) and signals in the interface format used by the robotic device 118 (such as RS-422). If a host utilizes the same signal format as the robotic device 118, the command relay port 150 may function as a conduit, or actually comprise signal carry-through circuitry.

Figure 1B:
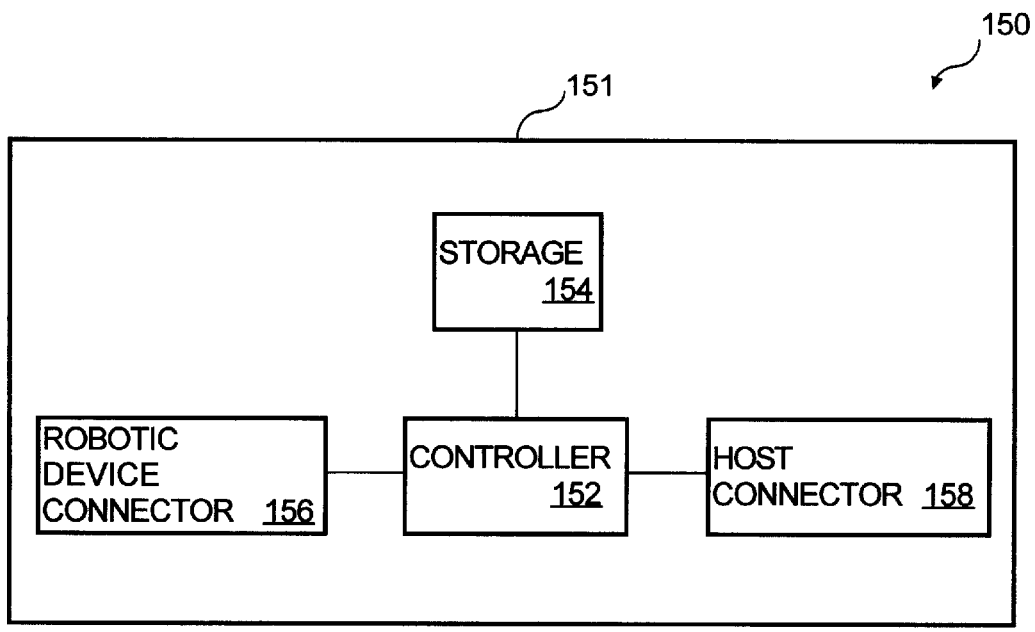
FIG. 1B is a block diagram of the hardware components and interconnections of an exemplary command relay port according to the invention.

To consider the construction of an exemplary command relay port in greater detail, reference is made to FIG. 1B. The command relay port 150 comprises a housing, such as a printed circuit board, metal box or other enclosure, etc. Within (or coupled to) the housing, the command relay port 150 includes a controller 152, storage 154, and connectors 156, 158. The host connector 158 is shaped for connection to the host connectors 110a–116a; directly to the connectors 122–128 or to a cable designed for coupling to the connector 122; directly to the host 106; or to any other coupling, mechanism, or device designed for coupling the port 150 to the host 106. The host connector 158 may even constitute the host connector 110a upon installation of the port 150 in its slot 110. The robotic device connector 156 is shaped for connection to the robotic device connector 110b; to a cable designed for coupling to the connector 110b; directly to one of the robotic device ports 118f; or to any other coupling, mechanism, or device designed for coupling the port 150 to the robotic device 118. The robotic device connector 156 may even constitute the connector 110b upon installation of the port 150 in its slot 110. The controller 152 comprises discrete circuitry, logic circuitry, ASICs, signal processing circuitry, microprocessors, or other digital or analog processing circuitry to translate between one signal format at the host connector 158 and another signal format at the robotic device connector 156. As one example, the controller 152 may serve to translate between SCSI or Fibre Channel signals (from a host) and RS-422 signals (at the robotic device 118). Some command relay ports may be designed for hosts that use the same signal format as the robotic device 118, in which case the command relay port 150 comprises a conduit, and may even omit the controller 152 and storage 154, with a shunt or carry-through circuitry substituted therefor. The storage 154 comprises circuitry memory, nonvolatile storage, buffers, memory registers, or any other digital data storage facility for use by the controller 152 in performing its translation tasks. The storage 154 may be integrated 151 into the controller 152, if desired.

Advantageously, to consolidate connectors and simplify slot construction, command relay ports for use in the library 102 may be built to the same size and connectivity standard(s) as the media drives to be received by the slots 110–116. As one example of the installation and use of a command relay port, the command relay port 150 is shown installed in the slot 110. The port 150 carries media transport commands of the host 106 to the robotic device 118, and also carries any return signals from the robotic device 118 back to the host 106.

For ease of reference, the term "relay module" is used to refer to hardware components configured to relay media transport commands between one or more hosts and the robotic device. Thus, "relay modules" may include command relay ports, dual purpose (combination) media drive and command relay port units, and the like.

Other Devices for Use in Slots

In addition to the command relay ports and media drives disclosed above, the invention also contemplates other occupants of the slots 110–116. For instance, each slot may house a Fibre Channel gateway, router, switch hub, network storage, Ethernet, DASD, or host. Another exemplary slot occupant is a storage emulator, for example, a device that makes the media items in the library appear to the hosts to be as a hard disk drive or other SCSI storage device. Furthermore, slots 110–116 may house dual purpose media drive/relay ports as taught by the '856 application mentioned above.

Robotic Device

The robotic device 118 includes a controller 118d, media handling mechanism 118c, command set storage 118a, partition map 118e, configuration record 118b, and ports 118f. The ports 118f comprise multi-conductor register ports, which are known in the art, or another suitable arrangement such as serial ports, fiber optic links, wireless links, etc. The media handling mechanism 118c includes servos, motors, arms, grippers, sensors and other robotic, mechanical, and electrical equipment to perform functions that include (at least) the transportation of media items between/among the media drives in the slots 110–116, storage bins 120, import/export areas, etc. The mechanism 11 8c may, for example, include a robotic arm or other cartridge handling device. As a more particular example, the mechanism 118c may comprise an accessor/gripper as taught by the commercially available IBM model 3494 data storage library.

As discussed below, the controller 118d comprises one or more data processing machines, which may be implemented using a variety of different hardware components. As one optional function, the controller 11 8d may communicate with the command relay ports 150 and media drives 152 for various housekeeping reasons, described in greater detail below. More importantly, the controller 118d enables the robotic device 118 to respond to high-level media transport commands originating with the hosts 106, 108 and transmitted to the robotic device via command relay ports (such as 150). As an example, some of these commands may comprise media movement commands identifying a particular media item and a desired media destination. Possible media destinations include, for example, media drives in the slots 110–116, the storage bins 120, import/export areas, etc. To illustrate one exemplary signal path, the controller 118d may receive media transport commands from the host 106 via the cable 107, external connector 122, host connector 110a, command relay port 150, robotic device connector 110b, and port 118f. The controller 118d uses these signals to generate more specific control signals compatible with the equipment of the mechanism 118c. These specific control signals include instructions to shift, rotate, grip, and other actions having the combined effect of achieving the desired media movement. Thus, the high-level, media transport commands from the hosts 106, 108 may simply direct the robotic device 118, for example, to load a media item from a given storage bin to one of the media drives. In contrast, control signals responsively generated by the controller 118d specifically instruct the mechanism 118c to effectuate vertical and horizontal movements, grip and release actions, rotating or pivoting, and any other movement appropriate to carry out the host's high-level media movement command.

As mentioned above, and also in further detail below, the controller 118d may be implemented in various ways. As a further option, the controller 118d may comprise a modular unit that plugs into one of the slots 110–116 and communicates with the remaining components of the robotic device 118 via one of the ports 110b–116b and one of the ports 118f. In still another embodiment, the controller 118d may comprise a shared function processor located in a media drive such as 152.

The command set storage 118a, partition map 118e, and configuration record 118b may be implemented with lookup tables, linked lists, files, records, databases, or any other data structure stored in volatile or nonvolatile memory, storage, hardware, or any other means. The command set 118a includes (1) certain commands, firmware routines, subroutines, software, or other functions invoked to initiate or respond to command relay ports, and (2) other firmware routines, commands, subroutines, software, or other functions invoked to initiate or respond to the media drives. The command sets 118a may also anticipate other types of slot occupants, such as Fibre Channel gateways, routers, switches, network storage, hosts, storage emulators, dual purpose media drives, etc.

In the present example, the command set for the command relay ports comprises a number of different functions that are called in response to different SCSI medium changer commands, these functions serving to carry out the SCSI commands by issuing specific instructions to the media handling mechanism 118c. The command sets 118a may include numerous subsidiary command sets to accommodate different manufacturers, makes, and/or models of media drives as necessary.

The configuration record 118b contains a record of the contents of each slot 110–116, that is, whether it contains nothing, a media drive, a command relay port, or another type of occupant. The configuration record 118b may also contain details about the slots' contents, such as the manufacturer, make, model, speed, and capacity of a media drive. The partition map 118e contains information designating one or more partitions, where each partition includes one or more of the following: slots 110–116, either/both of the media items and storage bins 120, import/export areas, etc. The configuration record also associates each media transport command entry node (such as a command relay port or dual purpose media drive) with a particular partition.

Exemplary Digital Data Processing Apparatus

As mentioned above, computing features such as the controller 118d and controller 152 may be implemented in various forms. As one example, one or both of the controller 118d and processor 152 may comprise separate digital data processing apparatuses, as exemplified by the hardware components and interconnections of the digital data processing apparatus 200 of FIG. 2.

The apparatus 200 includes a processor 202, such as a microprocessor, workstation, personal computer, or other processing machine, coupled to a storage 204. In the present example, the storage 204 includes a fast-access storage 206, as well as nonvolatile storage 208. The fast-access storage 206 may comprise random access memory ("RAM"), and may be used to store the programming instructions executed by the processor 202. The nonvolatile storage 208 may comprise, for example, battery backup RAM, EEPROM, one or more magnetic data storage disks such as a "hard drive", a tape drive, or any other suitable storage device. The apparatus 200 also includes an input/output 210, such as a line, bus, cable, electromagnetic link, or other means for the processor 202 to exchange data with other hardware external to the apparatus 200.

Despite the specific foregoing description, ordinarily skilled artisans (having the benefit of this disclosure) will recognize that the apparatus discussed above may be implemented in a machine of different construction, without departing from the scope of the invention. As a specific example, one of the components 206, 208 may be eliminated; furthermore, the storage 204 may be provided on-board the processor 202, or even provided externally to the apparatus 200.

Logic Circuitry

In contrast to the digital data processing apparatus discussed above, a different embodiment of the invention uses logic circuitry instead of computer-executed instructions to implement the controller 118d and/or controller 152. Depending upon the particular requirements of the application in the areas of speed, expense, tooling costs, and the like, this logic may be implemented by constructing an application-specific integrated circuit ("ASIC") having thousands of tiny integrated transistors. Such an ASIC may be implemented with CMOS, TTL, VLSI, or another suitable construction. Other alternatives include a digital signal processing chip ("DSP"), discrete circuitry (such as resistors, capacitors, diodes, inductors, and transistors), field programmable gate array ("FPGA"), programmable logic array ("PLA"), and the like.

OPERATION

Having described the structural features of the present invention, the operational aspect of the present invention will now be described. As mentioned above, the process aspect of the invention generally involves the robotic device recognizing how/whether each slot 110–116 is filled, and thereafter communicating with the occupant in certain appropriate ways. Although the present invention has broad applicability to media storage drives and removable data storage media of all types, the specifics of the structure that has been described is well suited for magnetic tape media, and the explanation that follows may emphasize such an application of the invention without any intended limitation.

Signal-Bearing Media

Figure 2:
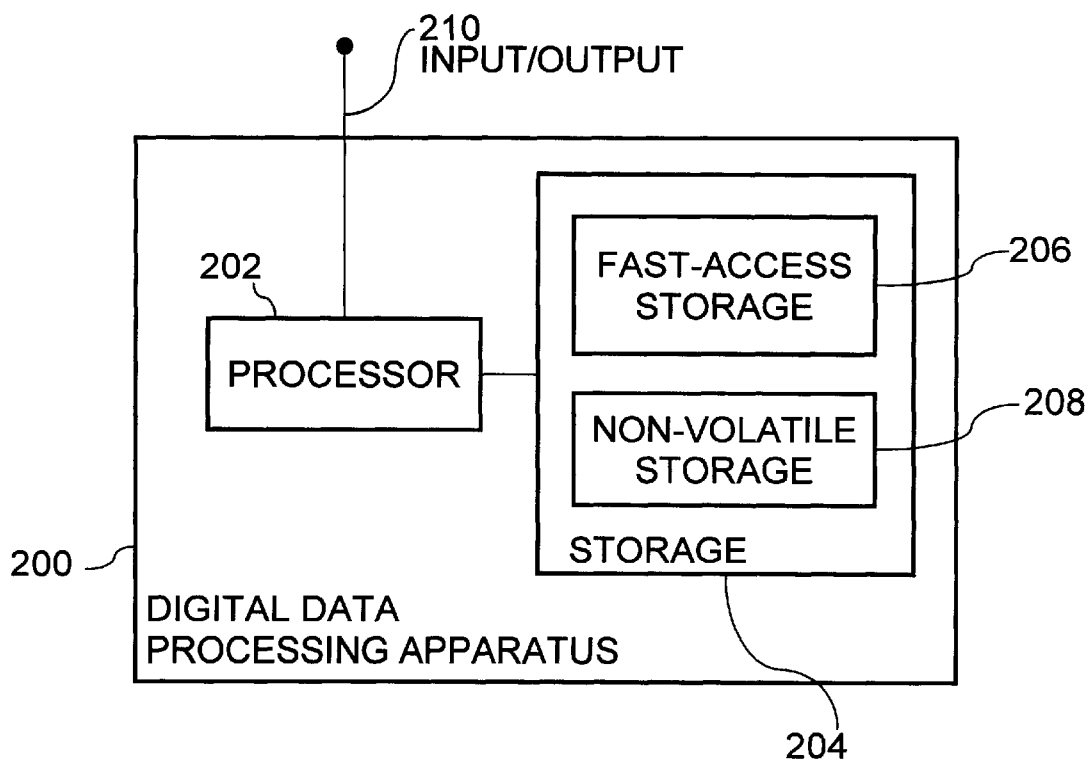
FIG. 2 is a block diagram of a digital data processing machine according to the invention.
Figure 3:
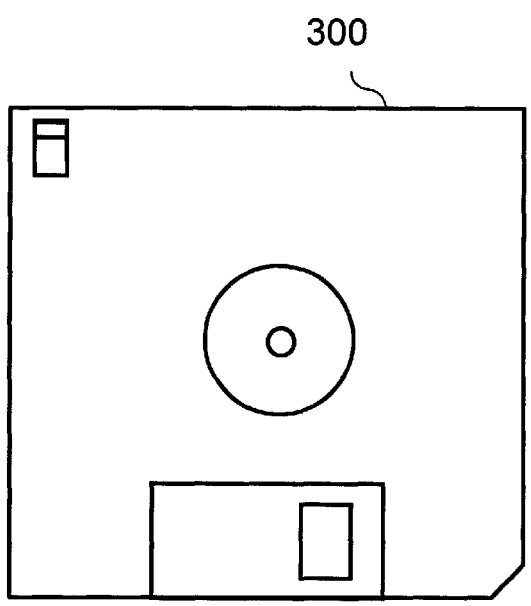
FIG. 3 shows an exemplary signal-bearing medium according to the invention.

In the embodiment where the controller 118d and controller 152 perform machine-executed program sequences, these sequences may be implemented in various forms of signal-bearing media. In the context of FIG. 2, such signal-bearing media may comprise, for example, the storage 204 or another signal-bearing media, such as a magnetic data storage diskette 300 (FIG. 3), directly or indirectly accessible by the processor 202. Whether contained in the storage 204, diskette 300, or elsewhere, the instructions may be stored on a variety of machine-readable data storage media. Some examples include direct access storage (e.g., a conventional "hard drive", redundant array of inexpensive disks ("RAID"), or another direct access storage device ("DASD")), serial-access storage such as magnetic or optical tape, electronic non-volatile memory (e.g., ROM, EPROM, or EEPROM), battery backup RAM, optical storage (e.g., CD-ROM, WORM, DVD, digital optical tape), paper "punch" cards, or other suitable signal-bearing media including analog or digital transmission media and analog and communication links and wireless communications. In an illustrative embodiment of the invention, the machine-readable instructions may comprise software object code, compiled from a language such as "C," assembly language, etc.

Logic Circuitry

In contrast to the signal-bearing medium discussed above, the method aspect of the invention may be implemented using logic circuitry instead, without using a processor to execute instructions. In this embodiment, the logic circuitry is implemented in the controller 118d and/or controller 152, and is configured to perform operations to implement the method of the invention. The logic circuitry may be implemented using many different types of circuitry, as discussed above.

Overall Sequence of Operation

Figure 4:
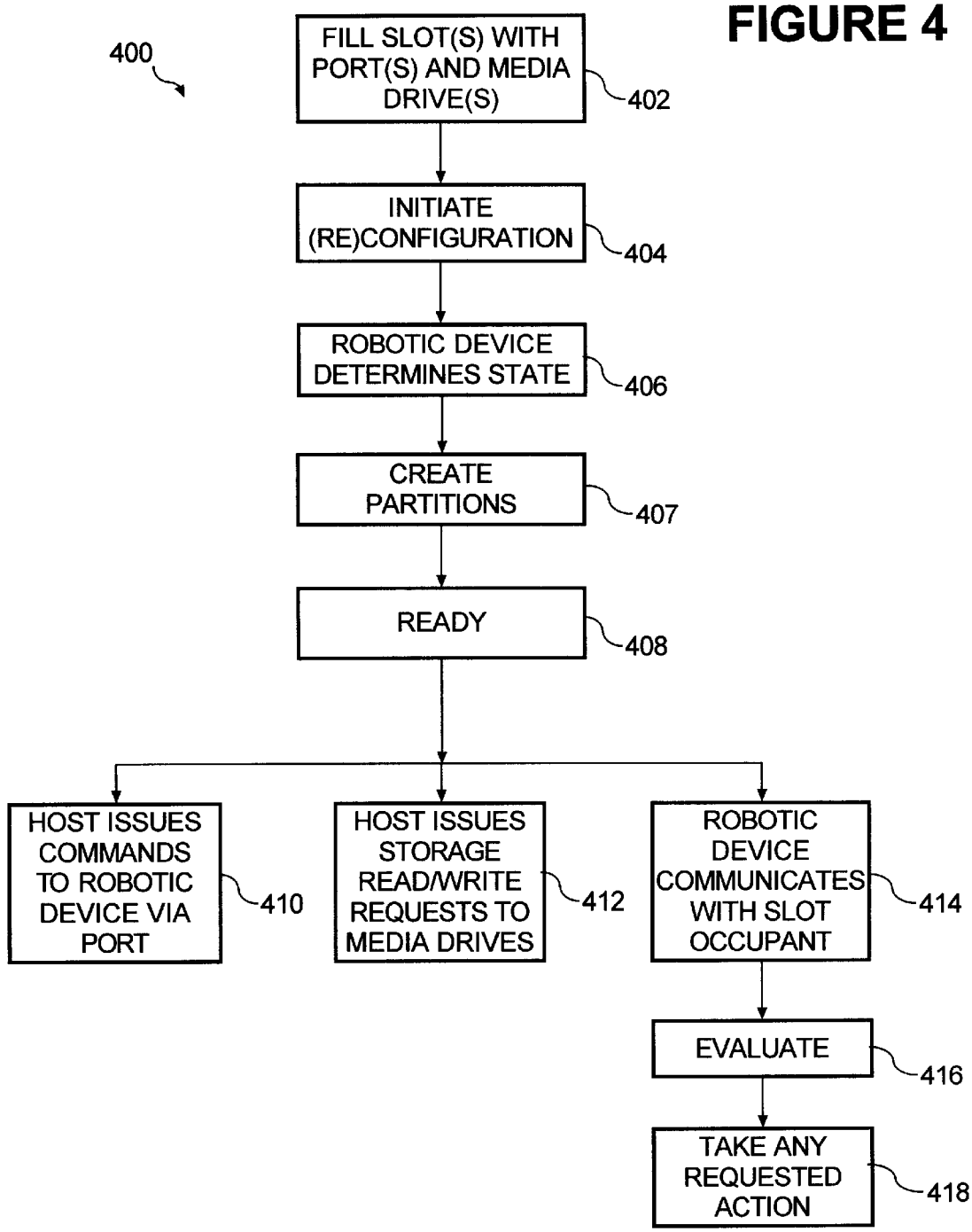
FIG. 4 is a flowchart showing a sequence for operating the data storage library of the invention.

FIG. 4 shows a sequence 400 to further illustrate one example of the method aspect of the present invention. Broadly, in this sequence one or more media drives and/or command relay ports are added to the library 102, after which the library 102 operates according to this configuration to satisfy hosts' data storage/retrieval needs. For ease of explanation, but without any intended limitation, the example of FIG. 4 is described in the context of the system of FIG. 1A as described above.

In step 402, a technician, installation engineer, system administrator, or other human operator loads one or more of the slots 110–116 with a command relay port or media drive. As mentioned above, the invention contemplates a variety of other devices for use in the slots, although the present discussion (for ease of illustration) focuses on command relay ports and media drives. In the example illustrated by FIG. 1A, the operator fills the slot 110 with a command relay port 150, and fills the slot 112 with a media drive 152. In step 404, the operator initiates configuration of the library 102. This involves issuing an appropriate command to the robotic device 118, which may originate from one of the following: one of the hosts 106, 108, a trigger, an auto configure sequence, a system administrator's console (not shown) coupled to the robotic device separately from the hosts, etc. If the library is first powering-up, step 404 triggers the first configuration of the library 102; if the library has been previously configured and operated, but step 402 changed the contents of the slots 110–116, then step 404 triggers reconfiguration of the library 102. In addition to providing an instruction to configure or reconfigure, the command of step 404 may contain other information, such as identification of different partitions in the library 102. Each partition may include one or more of the following: one or more media drives, import/export areas, media items in the storage bins 120 (identified by serial number of media items, row/column locations in the bins 120, pre-defined subsections 120a–120c of the bins 120, or another basis), or other library components. In addition to contents of the partitions, step 404 also maps between each partition and one or more particular slots, command relay ports, or dual purpose media drives to be used for routing media transport commands (pertaining to the partition of that slot) from hosts to the robotic device 118. Alternatively, rather than separately mapping between partitions and slots as such, the slots may be included in the partition definitions.

Responsive to step 404, the robotic device 118 determines the state of the slots 110–116 (step 406). Namely, for each slot, the robotic device 118 determines whether the slot is occupied or empty, and if occupied, what type of occupant resides therein. In the illustrated embodiment, the robotic device 118 determines whether each slot occupant is a media drive or command relay port. Depending upon the application, the robotic device 118 may recognize other occupant types as well, such as a Fibre Channel gateway, router, switch, hub, network storage, Ethernet, DASD, host, storage emulator, dual purpose media drives, etc. Step 406 may be performed by actually detecting certain properties of each slot's occupant, or by being advised of the slots' status. In one example of the detecting approach, the robotic device 118 exchanges messages with an occupant of each slot, via the appropriate robotic device port 110b–116b. In this embodiment, the robotic device 118 may utilize representative samples of different command sets to attempt communications with slots' occupants. After successfully communicating with a slot's occupant, the robotic device 118 may conduct more detailed communication using the now-confirmed command set, for example determining a media drive's manufacturer, make, model, speed, storage capacity, and other information. In a different example of the "detecting" approach, instead of exchanging messages, the robotic device 118 detects an electrical configuration of the slots' occupant, for example by sensing an electrical pull-up or pull-down that occurs when the slot is filled with command relay port or media drive. This pull-up or pull-down is achieved by an optional mechanical and electrical structure of the slot, many varieties of which will be apparent to ordinarily skilled artisans having the benefit of the this disclosure. In still another embodiment, the robotic device 118 operates an optical reader (not shown) such as a bar code reader or light sensor to detect a distinguishing bar code, reflective sensor, non-reflective sensor, or other visible indicator upon the slots' occupants. In still a different embodiment, the robotic device 118 uses touch, such as by experimentally contacting the slot occupant with a robotic finger or probe, or by experimentally attempting to load a media item into each slot's occupant to identify the occupant's type. Another embodiment utilizes a magnetic, "smart card", or other wireless reader to identify the slots' occupants by using scanning based on RF, inductive, or other electric or magnetic fields. After determining the slots' states according to one of the foregoing tasks (or a combination thereof) the robotic device 118 stores the results in the configuration record 118b.

In contrast with the foregoing, step 406 may be satisfied by specifically advising the robotic device 118 of the library's configuration. In this embodiment, a human operator manually examines each slot 110–116 and utilizes a system console to transmit this information to the robotic device 118, or even store the results directly in the configuration record 118b. In this embodiment, the robotic device determines the state of the slots (step 406) by receiving this input or by examining the, configuration record 118b containing this input.

In any case, the results of step 406 in the presently illustrated example include recognition by the robotic device 118 that a command relay port 150 lies in the slot 110, that a media drive 152 lies in the slot 112, and that slots 114, 116 are empty. In step 407, the robotic device 118 implements any applicable partitioning scheme. Each partition, if any are implemented, defines a set of facilities in the library to be exclusively used by only those hosts attached to that partition via a command relay port or dual purpose media drive. Each partition includes a set of facilities, which may comprise any of the following: one or more storage bins 120, one or more media items, one or more slots 110–116, or a combination of the foregoing. In the presently illustrated example, a partition is defined associating the host 106 with the port 150, media drive 152, and certain media items.

The robotic device 118 may learn of desired partitioning in various ways. For example, the robotic device 118 may consult the configuration record 118b to determine whether partition instructions were placed there back in step 404. In still another embodiment, the robotic device 118 may automatically discern desired partitions as shown in the following references:

1. U.S. Pat. No. 6,185,165 entitled "Positionable Vision Indicators for Configuring Logical Libraries," issued Feb. 2, 2001.
2. U.S. Pat. No. 6,044,442 entitled "External Partitioning of an Automated Data Storage Library into Multiple Virtual Libraries for Access by a Plurality of Hosts," issued Mar. 28, 2000. The entire content of the foregoing patents are hereby incorporated herein by reference.

After learning of any applicable partitioning scheme, the robotic device 118 will enforce this scheme when carrying out robotic device commands or read/write requests, as described below.

After step 407, the library 102 (and robotic device 118 in particular) stand ready to operate (step 408). In step 410, the host 106 issues media transport commands via the command relay port 150 instructing the robotic device to obtain and load media items to the media drive 152 as desired. In step 412, the host issues read/write requests to the media drive 152 instructing the media drive to READ, WRITE, ADVANCE, REWIND, and perform other operations in conjunction with the media item loaded therein.

In step 414, the robotic device 118 communicates with occupants of the slots 110, 112 as needed. For instance, the robotic device 118 may receive media transport commands from the command relay port 150. In this case, the robotic device 118 evaluates the received command (step 416) against the appropriate command set 118a, and if the command is proper, the robotic device 118 then takes whatever action is warranted (step 418). For example, if a LOAD command is received in step 414, the robotic device 118 in step 416 verifies the LOAD command and its syntax by comparing it against the command relay port command set. If the LOAD command is proper, the robotic device 118 executes the appropriate function (for example) to load the desired media item into the media drive 152 in step 418.

Advantageously, if the robotic device 118 in step 414 receives an AUDIT, INVENTORY, or other host command to learn the contents of the storage bins 120 (step 410), the robotic device 118 (step 418) only returns the contents of the partition assigned to the command relay port 150 from where the AUDIT, INVENTORY, or other command is received. Thus, the host 106 cannot "see" the contents of other hosts' partitions, lessening the likelihood of confusing media items among different hosts. Similarly, the robotic device (in step 418) rejects or otherwise dishonors host commands to LOAD or otherwise manipulate other partitions' media items. The robotic device 118 may reject host commands, for example, by returning an error message via the command relay port associated with the originating host.

Additionally occurring in step 416, the robotic device 118 evaluates the input of step 414 according to any applicable partitioning scheme. For instance, the robotic device 118 may refuse to honor a media transport command if the command concerns a media item outside the command initiator's partition. In an alternative embodiment, some or all of the partition enforcement duties may be performed by the slot occupants. In this embodiment, the robotic device 118 after creating the partitions (step 407) recruits the slot occupants to enforce the partitions. Namely, the robotic device 118 forwards partition information as necessary to the slot occupants, which grant or refuse media transport commands appropriate to the established partitions. More particularly, since each slot is associated with one partition, the robotic device 118 directs each slot occupant to only honor commands concerning media items or storage bins under the partition associated with that slot. Some examples of slot occupants that may be recruited in this manner include command relay ports (such as 150), dual purpose media drives, or any other module called upon by hosts to carry media transport commands to the robotic device 118. If desired, such devices may be additionally recruited to enforce other limitations on media transport commands, such as rejecting commands with improper syntax, rejecting unrecognized commands, etc.

Without any intended limitation, steps 410, 412, 414 are shown in parallel because there is a nearly infinite order in which host storage requests, media transport commands, and robotic device communications may occur. Moreover, each of the steps 410, 412, and 414 may be repeated as necessary, depending upon the data storage operations being conducted.

OTHER EMBODIMENTS

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated. Additionally, ordinarily skilled artisans will recognize that operational sequences must be set forth in some specific order for the purpose of explanation and claiming, but the present invention contemplates various changes beyond such specific order.

What is claimed is:

1. A method for operating a data storage/retrieval library that includes a robotic media transport device and a plurality of multipurpose slots, the method comprising:
   for each slot, determining a state of each slot comprising one of the following conditions: the slot is occupied by a media drive, the slot is occupied by a relay module configured to perform operations including relaying media transport commands from one or more hosts to the robotic media transport device, the slot is unoccupied;
   for each slot occupied by a relay module, the transport device receiving host media transport commands from the relay module and responsive to the received commands, performing operations comprising transporting media items among media locations comprising storage bins and media drives located in the slots.

2. The method of claim 1, the determining operation comprising recognizing whether the slot is occupied by a component from a list including one or more of the following: switch, hub, gateway, router, network storage, Ethernet module, storage device, host, storage emulator, combination media drive and command relay port.

3. The method of claim 1, the operations responsive to the received commands further comprising:
   restricting host access to components of the library according to predefined logical partitions, each partition exclusively associated with a different set of one or more relay modules occupying the slots, each partition defining a different group of one or more of the following: one or more media items, one or more media drives, one or more media storage locations.

4. The method of claim 3, where the operation of restricting host access comprises:
   the transport device instructing one or more slot occupants to restrict host access according to the predefined logical partitions;

the instructed slot occupants restricting host access according to the predefined logical partitions.

5. The method of claim 1, the transport device having access to a configuration record identifying one or more partitions, each partition exclusively associated with a different set of one or more relay modules occupying the slots, each partition including a different group of one or more of the following: one or more media items, one or more media drives, one or more media storage locations;

the operations responsive to the received commands further comprising, for all media transport commands arriving from a particular relay module, limiting host access to components of the partition associated with that relay module.

6. The method of claim 1, further comprising:

placing one or more media drives into respective ones of the slots.

7. The method of claim 1, further comprising:

placing one or more relay modules into respective ones of the slots.

8. The method of claim 1, the determining operation comprising at least one of the following:

the transport device exchanging messages with an occupant of one or more slots;

the transport device detecting electrical configuration of an occupant of one or more slots;

the transport device receiving operator input specifying the state of one or more slots;

the transport device utilizing an optical reader to detect one or more optical features displayed by an occupant of one or more slots;

the transport device attempting to load a media item into an occupant of one or more slots, and ascertaining the state of the slots by results of the attempts;

the transport device conducting wireless scanning of electromagnetic indicia of an occupant of one or more slots;

the transport device attempting to touch an occupant of one or more slots, and ascertaining the state of the slots by results of the attempted touch.

9. The method of claim 1, wherein:

the operations further comprise the transport device receiving a mapping between components of the library and one or more partitions, each partition exclusively associated with one or more relay modules;

the transporting operation further comprises dishonoring host commands that arrive via one relay module and seek access to library components of a partition associated with another relay module.

10. A method for operating a data storage/retrieval library that includes a robotic media transport device and a plurality of multipurpose slots, the method comprising:

for each slot, determining a state of each slot comprising one of the following conditions: the slot is occupied by a media drive, the slot is occupied by a command relay port, the slot is occupied by combination media drive and command relay port, the slot is unoccupied;

for each slot occupied by a command relay port and for each slot occupied by a combination media drive and command relay port, the transport device receiving host media transport commands therefrom and responsive to the received commands, performing operations comprising transporting media items among media locations comprising storage bins and media drives located in other slots.

11. A signal-bearing medium tangibly embodying a program of machine-readable instructions executable by a digital processing apparatus to perform operations to manage a data storage/retrieval library that includes a robotic media transport device and a plurality of multipurpose slots, the operations comprising:

for each slot, determining a state of each slot including one of the following conditions: the slot is occupied by a media drive, the slot is occupied by a relay module configured to perform operations including relaying media transport commands from one or more hosts to the robotic media transport device, the slot is unoccupied;

for each slot occupied by a relay module, the transport device receiving host media transport commands from the relay module and responsive to the received commands, performing operations comprising transporting the media items among media locations comprising storage bins and media drives located in the slots.

12. A logic circuit of multiple interconnected electrically conductive elements configured to perform operations to manage a data storage/retrieval library that includes a robotic device and a plurality of multipurpose slots, the operations comprising:

for each slot, determining a state of each slot including one of the following conditions: the slot is occupied by a media drive, the slot is occupied by a relay module configured to perform operations including relaying media transport commands from one or more hosts to the robotic media transport device, the slot is unoccupied;

for each slot occupied by a relay module, the transport device receiving host media transport commands from the relay module and responsive to the received commands, performing operations comprising transporting the media items among media locations comprising storage bins and media drives located in the slots.

13. A data storage/retrieval library apparatus, comprising:

a plurality of multipurpose slots;

a robotic media transport device programmed to perform library management operations comprising:

for each slot, determining a state of each slot including one of the following conditions: the slot is occupied by a media drive, the slot is occupied by a relay module configured to perform operations including relaying media transport commands from one or more hosts to the robotic media transport device, the slot is unoccupied;

for each slot occupied by a relay module, receiving host media transport commands from the relay module and responsive to the received commands, performing operations comprising transporting the media items among media locations comprising media storage bins and media drives located in other slots.

14. The apparatus of claim 13, the transport device being programmed such that the determining operation comprises recognizing whether the slot is occupied by a component from a list including one or more of the following: switch, hub, gateway, router, network storage, Ethernet module, storage device, host, storage emulator, combination media drive and command relay port.

15. The apparatus of claim 13, the transport device being further programmed such that the operations responsive to the received commands further comprise:

restricting host access to components of the library apparatus according to predefined logical partitions, each partition exclusively associated with a different set of one or more relay modules occupying the slots, each partition defining a different group of one or more of the following: one or more media items, one or more media drives, one or more media storage locations.

16. The apparatus of claim 15, where the operation of restricting host access comprises:

the transport device identifying predefined logical partitions to one or more slot occupants and instructing the slot occupants to restrict host access to library components according to the predefined logical partitions.

17. The apparatus of claim 16, further comprising:

one or more modules each residing in one of the slots, each module programmed to carry out transport device instructions to restrict host access to library components according to logical partitions identified by the transport device.

18. The apparatus of claim 13, the transport device having access to a configuration record identifying one or more partitions, each partition exclusively associated with a different set of one or more relay modules occupying the slots, each partition including a different group of one or more of the following: one or more media items, one or more media drives, one or more media storage locations;

the transport device being programmed such that the operations responsive to the received commands further comprise:

for all media transport commands arriving from a particular relay module, limiting host access to components of the partition associated with that relay module.

19. The apparatus of claim 13, further comprising:

one or more media drives occupying respective ones of the slots.

20. The apparatus of claim 13, further comprising:

one or more relay modules occupying respective ones of the slots.

21. The apparatus of claim 20, the relay modules comprising at least one of the following:

command relay ports, combination media drive and command relay port units.

22. The apparatus of claim 13, further comprising one or more of the following installed in one or more corresponding slots: switch, hub, gateway, router, network storage, Ethernet module, storage device, host, storage emulator, combination media drive and command relay port.

23. The apparatus of claim 13, further comprising:

one or more relay modules, each relay module comprising an interface to translate between a first format utilized by the hosts' media transport commands and a second format utilized by the robotic media transport device.

24. The apparatus of claim 13, the determining operation comprising at least one of the following:

the transport device exchanging messages with an occupant of one or more slots; the transport device detecting electrical configuration of an occupant of one or more slots;

the transport device receiving operator input specifying the state of one or more slots;

the transport device utilizing an optical reader to detect one or more optical features displayed by an occupant of one or more slots;

the transport device attempting to load a media item into an occupant of one or more slots, and ascertaining the state of the slots by results of the attempts;

the transport device conducting wireless scanning of electromagnetic indicia of an occupant of one or more slots;

the transport device attempting to touch an occupant of one or more slots, and ascertaining the state of the slots by results of the attempted touch.

25. The apparatus of claim 13, the transport device further comprising:

command set storage containing one or more software functions compatible with predefined media drives and one or more software functions compatible with predefined relay modules.

26. The apparatus of claim 13, wherein the transport device is programmed such that the operations further comprise:

the transport device receiving a mapping between components of the library apparatus and one or more partitions, each partition exclusively associated with one or more relay modules;

dishonoring host commands that arrive via one relay module and seek access to library components of a partition associated with another relay module.

27. The apparatus of claim 13, each slot comprising:

a bay sized to slidably receive one of the following: a media drive of predetermined configuration, a relay module of predetermined configuration;

one or more connectors configured to connect an occupant of the bay to the transport device.

28. A data storage/retrieval library apparatus, comprising:

multiple slot means each for detachably receiving occupants of predetermined configuration;

robotic media transport means for performing library management operations comprising:

for each slot means, determining a state of each slot means including one of the following conditions: the slot means is occupied by a media drive, the slot means is occupied by a relay module configured to perform operations including relaying media transport commands from one or more hosts to the robotic media transport device, the slot means is unoccupied;

for each slot means occupied by a relay module, receiving host media transport commands from the relay module and responsive to the received commands, performing operations comprising transporting the media items among media locations comprising media storage bins and media drives located in the slot means.

* * * * *